(12) United States Patent
Bietz

(10) Patent No.: US 11,569,047 B2
(45) Date of Patent: Jan. 31, 2023

(54) ASSEMBLY AND METHOD FOR DAMPING SWITCHING MOVEMENTS IN HIGH-VOLTAGE CIRCUIT BREAKERS

(71) Applicant: Siemens Energy Global GmbH & Co. KG, Munich (DE)

(72) Inventor: Marian Bietz, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 434 days.

(21) Appl. No.: 16/630,563

(22) PCT Filed: Jun. 13, 2018

(86) PCT No.: PCT/EP2018/065602
§ 371 (c)(1),
(2) Date: Jan. 13, 2020

(87) PCT Pub. No.: WO2019/011562
PCT Pub. Date: Jan. 17, 2019

(65) Prior Publication Data
US 2021/0082637 A1     Mar. 18, 2021

(30) Foreign Application Priority Data

Jul. 13, 2017  (DE) .................. 10 2017 212 021

(51) Int. Cl.
*F16F 9/48*         (2006.01)
*H01H 3/60*         (2006.01)
(Continued)

(52) U.S. Cl.
CPC ............. *H01H 3/605* (2013.01); *F16F 9/185* (2013.01); *F16F 9/3257* (2013.01); *F16F 9/34* (2013.01);
(Continued)

(58) Field of Classification Search
CPC ........ F16F 9/34; F16F 9/44; F16F 9/48; F16F 9/486; H01H 3/605; H01H 9/02
(Continued)

(56) References Cited

U.S. PATENT DOCUMENTS 2,883,181 A    4/1959  Hogan
3,610,855 A    10/1971 Mitsuhashi
(Continued)

FOREIGN PATENT DOCUMENTS

CN    1449955 A     10/2003
CN    101364498 A   2/2009
(Continued)

*Primary Examiner* — Christopher P Schwartz
(74) *Attorney, Agent, or Firm* — Laurence A. Greenberg; Werner H. Stemer; Ralph E. Locher

(57) ABSTRACT

An assembly for damping switching movements has a housing, which physically surrounds at least one piston, and which at least partly physically surrounds at least one rod. The rod is movable relative to the housing. The piston delimits a first fluid volume, which is fluidically connected to a second fluid volume by way of a throughflow opening. The rod is formed at one end as a hollow tube and physically surrounds the first fluid volume. The piston is guided in the hollow-tubular end of the at least one rod. A method for damping switching movements in a high-voltage circuit breaker includes decreasing a damping rate of the assembly for damping in a period in the time profile of the switching movement, in particular after a previous increase in the damping rate during the switching movement.

16 Claims, 2 Drawing Sheets

(51) Int. Cl.
*F16F 9/18* (2006.01)
*F16F 9/32* (2006.01)
*F16F 9/34* (2006.01)
*F16F 9/49* (2006.01)
*F16F 15/023* (2006.01)
*H01H 9/02* (2006.01)

(52) U.S. Cl.
CPC .............. *F16F 9/49* (2013.01); *F16F 15/023* (2013.01); *H01H 9/02* (2013.01); *F16F 2222/12* (2013.01); *F16F 2228/066* (2013.01); *F16F 2232/08* (2013.01); *F16F 2234/02* (2013.01)

(58) Field of Classification Search
USPC .................................................. 188/286–289
See application file for complete search history.

(56) References Cited

U.S. PATENT DOCUMENTS

| | | | |
|---|---|---|---|
| 4,044,865 A | 8/1977 | Tourunen | |
| 4,059,175 A * | 11/1977 | Dressell, Jr. | F16F 9/48 188/315 |
| 4,284,177 A * | 8/1981 | Domek | F16F 9/486 188/289 |
| 4,693,454 A | 9/1987 | Tsuchiya et al. | |
| 5,044,865 A | 9/1991 | Baer et al. | |
| 5,509,513 A * | 4/1996 | Kiesel | F16F 9/486 188/289 |
| 6,883,650 B2 * | 4/2005 | van Wonderen | F16F 9/462 188/287 |
| 9,133,902 B2 * | 9/2015 | Spyche, Jr. | F16F 9/44 |
| 11,199,237 B2 * | 12/2021 | Anderson | F16F 9/3235 |

FOREIGN PATENT DOCUMENTS

| | | |
|---|---|---|
| CN | 202549751 U | 11/2012 |
| CN | 104134557 A | 11/2014 |
| DE | 1265267 B | 4/1968 |
| DE | 2624475 A1 | 12/1977 |
| DE | 3150081 A1 | 7/1982 |
| DE | 3215243 A1 | 7/1983 |
| DE | 3346353 A1 | 7/1985 |
| DE | 19625128 A1 | 12/1997 |
| DE | 10024499 A1 | 11/2001 |
| DE | 102015216172 A1 | 3/2017 |
| EP | 2487383 A1 | 8/2012 |
| EP | 3018685 A1 | 5/2016 |
| FR | 1402818 A | 6/1965 |
| WO | 2017036719 A1 | 3/2017 |

* cited by examiner

ASSEMBLY AND METHOD FOR DAMPING SWITCHING MOVEMENTS IN HIGH-VOLTAGE CIRCUIT BREAKERS

BACKGROUND OF THE INVENTION

Field of the Invention

The invention relates to an assembly and to a method for damping switching movements, having a housing which spatially surrounds at least one piston and which at least partially spatially surrounds at least one rod. The rod is mounted so as to be movable relative to the housing. The at least one piston delimits a first fluid volume which is directly or indirectly fluidically connected via at least one throughflow opening to at least one second fluid volume.

High-voltage circuit breakers switch voltages in the range of up to 1200 kV. Such breakers must switch very quickly, in particular in the range of milliseconds. For this purpose, contact pieces are moved mechanically very quickly, in particular by means of elements of the kinematic chain, such as for example a switching rod. The mechanical energy for the fast movements is provided by a drive, for example by a spring store drive, and is for example transmitted by means of a gearing and/or via a lever mechanism to the movable contact pieces. The movement profile, that is to say the profile with respect to time, of the transmitted kinetic energy and/or force is determined by means of the selection of the drive and elements of the kinematic chain, for example the gearing. In order to prevent damage to elements of the kinematic chain, it is for example necessary for elements to be braked at the end of the switching movement. For this purpose, use may be made of dampers, in particular hydraulic dampers.

The document DE 32 15 243 A1 has disclosed a hydraulic damper in the form of a cylinder-piston apparatus on a switching rod. During a movement of the switching rod, a liquid, for example oil, is moved by means of a piston from one liquid volume into another liquid volume. The two liquid volumes are separated from one another by a cylindrical partition, wherein through-extending slots and bores are arranged as throughflow openings or fluid channels in the partition. The bores all have the same cross section and are arranged with regular spacings to one another in the lower region of the partition. The viscous liquid, that is to say friction as the liquid flows through the throughflow openings, leads to a damping of the movement, in particular at the end of the disconnection movement. The switching rod is braked by means of the damper in particular at the end of the disconnection movement.

The regular arrangement of the throughflow openings formed with equal throughflow cross section leads, as the disconnection movement progresses, to an ever greater increase of the damping at the end of the movement. In the lower region of the cylinder-piston apparatus, the number of bores through which liquid can flow from the inner liquid volume into the outer liquid volume decreases as the disconnection movement progresses. Thus, the effective total flow cross section for the liquid for the flow of the liquid from the inner liquid volume into the outer liquid volume decreases. Less liquid can flow per unit of time from the inner liquid volume into the outer liquid volume, and the counterpressure against the piston increases. As a result, the damping of the movement increases, and the switching rod is braked progressively more intensely, that is to say more quickly. The braking of the movement of the switching rod during the disconnection process does not take place linearly over time, with a constant damping constant, but is intensified, that is to say the damping increases.

The development of new breakers, in particular high-voltage circuit breakers with vacuum tubes and clean air as isolator gas requires different movement profiles than known high-voltage circuit breakers with nominal-current and arc contact pieces in, for example, an $SF_6$ environment. The movement profiles can be generated by means of more complex forms of gearing and additional elements in the kinematic chain, such as for example levers. This is expensive and technically complex. Hydraulic dampers known from the prior art permit only damping with a damping constant which remains constant over time, or increasing damping, for example as the disconnection movement progresses. Damping with an increasing and subsequently decreasing damping rate during a movement or damping constant of the dampers is not possible with the described construction. It is thus not possible with the hydraulic dampers known from the prior art to easily and inexpensively generate a movement profile which exhibits an increasing braking action in particular of the switching rod during the disconnection process, with a temporally subsequent decrease of the braking action or damping rate.

SUMMARY OF THE INVENTION

It is an object of the present invention to specify an assembly and a method for damping switching movements in particular in high-voltage circuit breakers, which assembly and method are simple and inexpensive and, in particular during the disconnection process, permit an increase and decrease of the damping rate during a switching process. In particular, it is an object to specify an assembly in the form of a hydraulic damper in particular for high-voltage circuit breakers, with which, by means of the damper, a movement profile is made possible with braking and subsequent acceleration for example of a switching rod, in particular toward the end of a switching movement.

The stated object is achieved according to the invention by means of an assembly for damping switching movements having the features as claimed and/or by means of a method for damping switching movements in a high-voltage circuit breaker, in particular using the above-described assembly, as claimed. The dependent claims specify advantageous embodiments of the assembly according to the invention for damping switching movements and/or of the method for damping switching movements in a high-voltage circuit breaker, in particular using the above-described assembly. Here, subjects of the main claims are combinable with one another and with features of dependent claims, and features of the dependent claims are combinable with one another.

An assembly according to the invention for damping switching movements comprises a housing which spatially surrounds at least one piston and which at least partially spatially surrounds at least one rod. The rod is mounted so as to be movable relative to the housing. The at least one piston delimits a first fluid volume which is directly or indirectly fluidically connected via at least one throughflow opening to at least one second fluid volume. The at least one rod is of hollow tubular form at one end and spatially surrounds the first fluid volume. The at least one piston is guided in the hollow tubular end of the at least one rod.

The described construction of the assembly for damping switching movements, in particular in high-voltage circuit breakers, is simple and inexpensive. In particular during the disconnection process, an increase and decrease of the damping rate in temporal succession during a switching process is possible. The assembly is designed in the form of a hydraulic damper and, by means of the damper, permits a movement profile for example of a switching rod with connected movable contact piece or contact pieces with braking and subsequent acceleration in particular toward the end of the switching movement. An accelerated movement toward the end of the switching movement is expedient in particular for high-voltage circuit breakers with vacuum breakers.

The at least one piston may be arranged spatially fixedly relative to the housing. The switching rod is movable and the piston is guided in the hollow tubular end of the at least one rod, wherein, during a movement, the rod moves in the housing and the piston is static relative to the housing. During a movement of the rod, the piston, which is fixed relative to the housing, moves relative to the rod in the hollow tubular end of the rod. The fluid in the first fluid volume flows through the throughflow openings. Depending on the sum of the diameter of the throughflow openings, only a certain quantity of fluid can flow through the throughflow openings per unit of time, and a counterpressure to the movement of the piston relative to the rod is built up in the first fluid volume. In this way, the movement of the piston relative to the rod, or the movement of the rod, is dampened or braked.

The piston may in particular be connected by means of a web to the housing. In this way, the web is mechanically, spatially fixed relative to the housing. The web may have a smaller cross section perpendicular to the longitudinal axis of the web than the piston. Here, a fluid volume in the form of a fluid channel through which flow can pass forms between the piston and hollow tubular end of the rod. The second fluid volume comprises the fluid channel through which flow can pass.

The first fluid volume may be connected to the second fluid volume via a third fluid volume, in particular with fluidic connection of the first and third fluid volumes and of the third and second fluid volumes via throughflow openings in a wall of the hollow tubular end of the at least one rod. Here, as a result of the movement of the piston relative to the hollow tubular end of the rod, a pressure forms in the first fluid volume in a manner dependent on the fluid, on the size of the first fluid volume and on the cross section, through which flow can pass, of the throughflow openings that are in fluidic contact with the first fluid volume. Furthermore, as a result of the movement of the piston relative to the hollow tubular end of the rod, a pressure forms in the second fluid volume in a manner dependent on the fluid, on the size of the second fluid volume and on the cross section, through which flow can pass, of the throughflow openings that are in fluidic contact with the second fluid volume. The damping of the movement of the rod at a point in time is dependent on the pressures in the first and second fluid volumes. Pressure equalization between the first and second fluid volumes is realized via the throughflow openings and the third fluid volume.

The first fluid volume may be delimited by the wall of the hollow tubular end of the at least one rod and by the piston. The third fluid volume may be formed between the rod and the housing. The second fluid volume may be delimited by the housing and by the wall of the hollow tubular end of the at least one rod and also in particular by the piston with web and in particular may comprise openings which are closed by the housing.

Multiple throughflow openings may be incorporated, in particular arranged in the wall of the hollow tubular end of the at least one rod along the longitudinal axis of the rod. With progressive movement of the rod along the longitudinal axis in the direction of the piston, whereby the first fluid volume decreases, the piston moves over throughflow openings and closes these. The total cross section of the throughflow openings for the fluid for flowing out of the first fluid volume decreases. Here, on the opposite side of the piston, throughflow openings may be opened up with progressive movement. On the latter side, the piston may be fastened via a web to the housing, wherein the web is formed so as to be of smaller circumference than the piston. In this way, a fluid channel is formed between the wall of the hollow tubular end of the at least one rod and the web, which fluid channel ends in the fluid volume part between housing and rod at the end of the rod and is incorporated by the second fluid volume.

In a region which is shorter along the longitudinal axis of the rod than the web, in particular with a substantially identical longitudinal axis of the web, rod and/or housing, the housing may have a reduced inner diameter. This constricted region may have substantially the inner diameter, which corresponds to the outer diameter of the rod in said region. With progressive movement of the rod, throughflow openings in the wall of the rod can be closed toward the outside in the constricted region by the housing, whereby the total cross section for the throughflow of fluid from the third toward the second fluid volume changes, along with the damping rate.

The fluid throughflow and thus the damping rate of the assembly can thus be determined by the total cross section of throughflow openings for the throughflow of fluid from the first to the third fluid volume in conjunction with the total cross section of throughflow openings for the throughflow of fluid from the third to the second fluid volume. The total cross sections, that is to say the sum of the cross sections of throughflow openings for the throughflow of fluid, change over the course of the movement of the rod, in particular as a result of closure of throughflow openings between the first and third fluid volumes by means of the piston and as a result of opening-up of throughflow openings between the third and second fluid volumes on the other side of the piston and as a result of closure of throughflow openings by the housing, in particular by the constricted region of the housing.

Throughflow openings with different throughflow cross sections may be incorporated. Accordingly, for example by means of alternately large and small cross sections of the throughflow openings along the movement direction of the rod, it is possible to achieve an increase of the damping with progressive movement of the rod, with a subsequent decrease of the damping or of the damping rate. It is also possible for the number of throughflow openings per unit of length of the rod to be selected in a determined manner, or for the shape and/or arrangement thereof at regular or irregular intervals along the circumference and/or along the longitudinal axis of the rod to be varied, in order to determine or define the total cross sections, that is to say the sum of the cross sections of throughflow openings for the throughflow of fluid from one to the other fluid volume, in particular from the first to the third fluid volume and/or from the third to the second fluid volume and vice versa, at all points in time during the movement.

Between the housing and the at least one rod, there may be arranged a hollow sleeve in which the hollow tubular end of the at least one rod is guided, in particular with throughflow openings in the sleeve.

The sleeve may divide the third fluid volume into two parts, in particular with at least one throughflow opening which fluidically connects the two parts of the third fluid volume to one another. At least one throughflow opening may be arranged in particular in the wall of the hollow tubular end of the at least one rod, which at least one throughflow opening fluidically connects a first part of the third fluid volume to the first fluid volume. At least one throughflow opening may be arranged in the sleeve in particular at the end of the sleeve, which at least one throughflow opening fluidically connects a second part of the third fluid volume to the second fluid volume. In particular through the selection of the size, shape and arrangement of the throughflow openings in the sleeve and/or in the wall of the rod, the damping of the assembly can, as described above, be predetermined or defined, that is to say controlled, over the profile with respect to time of the movement.

Elements of the assembly may be of cylindrical form, in particular the housing and/or the at least one rod and/or the at least one piston and/or at least one sleeve and/or at least one web. Cylindrical elements are simple and inexpensive to produce and exhibit high mechanical stability.

Throughflow openings may be formed as a permanent bore or milled portion and/or may be of flute-like form. "Flute-like" hereinafter means that different throughflow openings may be formed one behind the other along the longitudinal axis and/or adjacent to one another along the circumference, in particular with different cross sections, correspondingly to the openings in a flute, with the advantages described above.

The first and/or the second and/or the third fluid volume may in particular be completely filled with a fluid and/or a fluid mixture. Fluids are for example gases including gas mixtures, in particular air and/or clean air, and/or liquids including liquid mixtures, in particular oils. The viscosity of the fluid can jointly determine the damping.

The assembly may be incorporated by a high-voltage circuit breaker, in particular for the purposes of damping switching movements. Through the use of the assembly in high-voltage circuit breakers, in particular in the case of voltages up to 1200 kV and/or currents of several hundred amperes, damping of the switching movement of contact pieces and other elements of the kinematic chain of the breaker, for example of the switching rod, is possible. Novel movement profiles, in particular with an increase of the damping at the start of the switching movement and a decrease of the damping at the end of the switching movement, are possible in a simple and inexpensive manner. In this way, it is for example the case that a switching rod is braked with progressively increasing intensity at the start of a connection movement, and, at the end of the connection movement, it is possible, in particular for vacuum breakers, to realize a reduction of the braking action to the point of an acceleration of the switching rod, for example in order to attain energy for a latching of contact pieces in the contacted, pressed-together state. The energy may likewise be utilized in order to stress a spring which assists a separation of contact pieces during the disconnection. The assembly according to the invention permits, during the disconnection, for example low damping at the start of the switching movement, an increase of the damping during the switching movement and/or a decrease of the damping toward the end of the switching movement. In particular through the shape, arrangement and cross section of the throughflow openings, for example with alternating increasing and decreasing cross sections, it is possible to realize different movement profiles with successively alternating increases and decreases in the damping.

A method according to the invention for the damping of switching movements in a high-voltage circuit breaker, in particular using the above-described assembly, comprises that the damping rate of the assembly for the damping decreases in a time period in the profile with respect to time of the switching movement, in particular after a prior increase of the damping rate during the switching movement.

Here, a rod with a hollow tubular end may be moved in a housing such that a piston is moved in the hollow tubular end of the rod and a fluid flows from a first fluid volume in the hollow tubular end of the rod via throughflow openings in the wall of the hollow tubular end into a third fluid volume which is formed between the rod and the housing, and fluid flows from a second fluid volume, which is surrounded by the piston, by the end of the rod and by the housing, via throughflow openings in the wall of the hollow tubular end of the rod into the third fluid volume.

Alternatively, a rod with a hollow tubular end may be moved in a sleeve, which is arranged in a housing, such that a piston is moved in the hollow tubular end of the rod and a fluid flows from a first fluid volume in the hollow tubular end of the rod via throughflow openings in the wall of the hollow tubular end into a first part, which is formed between the rod and the sleeve, of the third fluid volume, and fluid flows from the first part of the third fluid volume into a second part of the third fluid volume via throughflow openings in the sleeve, wherein the second part of the third fluid volume is formed by the sleeve and by the housing, and fluid flows from a second fluid volume, which is surrounded by the piston, by the end of the rod, by the sleeve and by the housing, into the second part of the third fluid volume via throughflow openings in the sleeve.

The advantages of the method according to the invention for damping switching movements in a high-voltage circuit breaker, in particular using the assembly described above, as claimed are analogous to the above-described advantages of the assembly according to the invention for damping switching movements as claimed, and vice versa.

Below, exemplary embodiments of the assembly for damping switching movements according to the prior art are illustrated in FIGS. 1 and 2, and exemplary embodiments of the assembly according to the invention for damping switching movements are schematically illustrated in FIGS. 3 and 4, and are described in more detail below.

DESCRIPTION OF THE INVENTION

Figure 1:
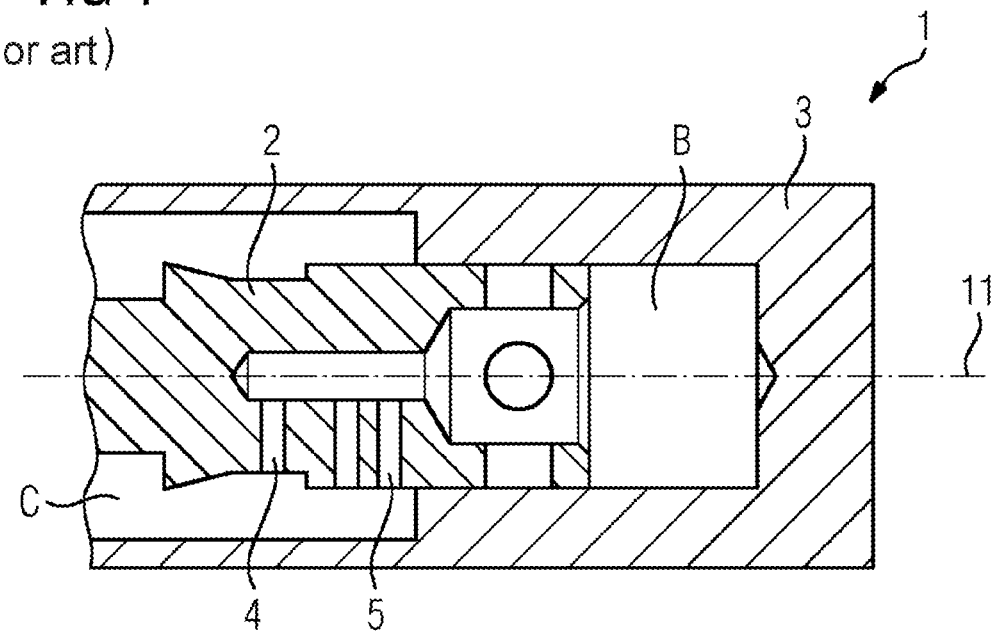
FIG. 1 schematically shows a part of an assembly 1 for damping switching movements according to the prior art along a longitudinal section, with a movable piston rod 2 in a housing 3, and with throughflow openings 4, 5 at one end of the piston rod 2, and FIG. 2 schematically shows, in a sectional view, a part of an assembly 1 analogous to FIG. 1, with throughflow openings 4, 5 in a sleeve 6 between piston rod 2 and housing 3 instead of throughflow openings in the piston rod 2, and FIG. 3 schematically shows a part of an assembly 1 according to the invention for damping switching movements along a longitudinal section, in the form of a first exemplary embodiment, with a piston 8 fixedly connected to a housing 3, which piston is guided in a hollow tubular end 13 of a rod 7, with throughflow openings 10, 14 in the wall of the hollow tubular end 13, and FIG. 4 schematically shows, in a sectional view, a second, alternative exemplary embodiment of the assembly 1 according to the invention of FIG. 3, with a sleeve 6 with throughflow openings, arranged between hollow tubular end 13 of the rod 7 and housing 3.

FIG. 1 schematically illustrates a part of an assembly 1 for damping switching movements according to the prior art. The part, which is shown as a section along a longitudinal axis, comprises a movable piston rod 2 in a housing 3, wherein a damping of the movement of the piston rod 2 is realized by means of fluid flows through throughflow openings 4, 5 in the end of the piston rod 2. For this purpose, two fluid volumes B, C in the housing 3 are fluidically connected to one another via throughflow openings, in particular in the form of bores in the piston rod 4, 5.

The piston rod 2 is, with the outer circumference at one end, formed so as to be substantially equal to the inner circumference of the housing 3, and is mounted movably in the housing and guided along the longitudinal axis 11 in the housing 3. The housing 3, the piston rod 2 and bores are of substantially rotationally symmetrical and/or cylindrical form. The hollow cylindrical or tubular housing 3 and the piston rod 2 have substantially one longitudinal axis 11 along which the piston rod 2 is movable relative to the housing 3 in the housing 3. At one end of the piston rod 2 and of the hollow tubular housing 3, wherein the latter is closed at the end, the fluid volume B is formed between piston rod 2 and hollow tubular housing 3.

The piston rod 2 is formed, at the end, in the shape of a piston, that is to say with a larger circumference than the circumference in the regions of the piston rod 2 remote from the end. The hollow tubular housing 3 is formed with a smaller circumference in the region of the piston than the circumference in regions of the housing 3 remote from the end. In the region of the end of the piston rod 2, at least a part of the piston terminates in substantially fluid-tight fashion with the housing 2, and, along the region of the housing 3 with relatively large circumference, a fluid volume C is formed between piston rod 2 and housing 3.

During movement of the piston rod 2 in the direction of the end of the housing 3, as illustrated in FIG. 1, the fluid in the fluid volume B is compressed, and the elevated pressure in the fluid volume B gives rise to a force opposed to the movement direction of the movement of the piston rod 2. The elevated pressure leads to a fluid flow through the throughflow openings 4, 5 in the end of the piston rod 2 in order to realize a pressure equalization between the fluid volumes B and C. The fluid is for example a gas or gas mixture, such as for example air, or comprises a liquid or a liquid mixture, for example an oil. A fluid flow through the throughflow openings 4, 5 is dependent inter alia on the number of throughflow openings 4, 5, on the position, shape and cross section thereof, and on the fluid, in particular the viscosity thereof. The braking of the piston rod 2 in the housing 3 occurs in a manner dependent on this, that is to say the magnitude of the damping or the damping constant of the assembly 1 is dependent on this.

The throughflow openings 4, 5 are formed along the longitudinal axis 11 as permanent bores 4 and/or for example in the form of flute bores 5. Flute bores 5 are bores arranged along the longitudinal axis 11 with a certain spacing to one another, in particular with a uniform and/or varying spacing between bores. Analogously to the openings in a flute, the flute bores 5 may have identical or different diameters or cross sections, by which the fluid flow is jointly determined.

With progressive movement of the piston rod 2 in the direction of the end, an increasing number of flute bores 5 are closed by the housing 2, that is to say by the region of the housing 3 at the end, with a smaller circumference than the remaining region of the housing 3. The total cross section of the throughflow openings 5 that are available for the fluid flow or through which fluid flows decreases. The damping or damping rate of the assembly 1 therefore increases with progressive movement of the piston rod 2 in the direction of the end.

With progressive movement of the piston rod 2 in the opposite direction, away from the end, an increasing number of flute bores 5 are no longer closed by the housing 2, that is to say are opened up by the region of the housing 3 at the end, with a smaller circumference than the remaining region of the housing 3. The total cross section of the throughflow openings 5 that are available for the fluid flow or through which fluid flows increases. The damping or damping rate of the assembly 1 therefore decreases with progressive movement of the piston rod 2 away from the end.

Permanent bores 4 are not closed during and after the movement. In this way, a fluid flow is possible during the entire movement, and, in particular, fluid of the fluid volume B can be transferred entirely into the fluid volume C and into throughflow openings 4, 5. During a movement of the piston rod 2 in one direction, only a decrease or an increase of the damping or damping rate occurs. An increase and subsequent decrease of the damping or damping rate during one movement, that is to say a movement in one direction, is not possible.

Figure 2:
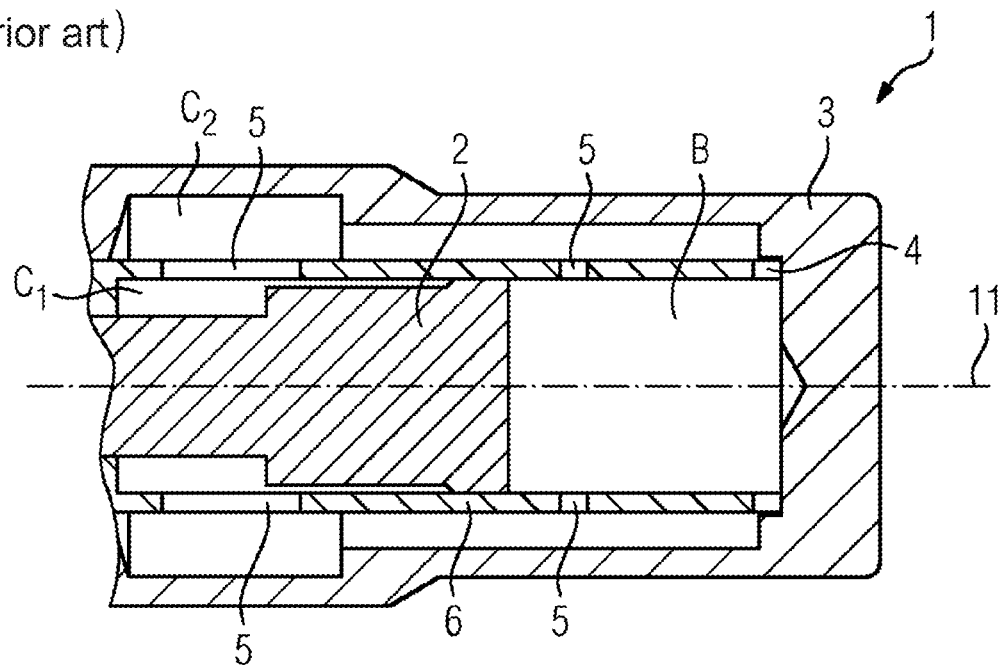

FIG. 2 schematically illustrates a part of an alternative assembly 1 for damping switching movements according to the prior art. The part, shown as a section along a longitudinal axis, comprises a movable piston rod 2 in a housing 3, analogously to the assembly of FIG. 1. In the exemplary embodiment of the assembly 1 of FIG. 2, a sleeve 6 is arranged between piston rod 2 and housing 3. In the exemplary embodiment of the assembly 1 of FIG. 2, throughflow openings 4, 5 are formed not in the piston rod 2 but in the sleeve 6, by contrast to the exemplary embodiment of the assembly 1 in FIG. 1.

Damping of the movement of the piston rod 2 is realized by means of fluid flows through throughflow openings 4, 5 in the sleeve 6. The two fluid volumes B, C in the housing 3 are fluidically connected to one another via the throughflow openings 4, 5 in the sleeve. The fluid volume B is formed between an end of the piston rod 2, the sleeve 6 and an end of the housing 3. The fluid volume C is divided by the sleeve into two parts C1 and C2. The fluid volume C1 is formed between the piston rod 2 and the sleeve 6. The fluid volume C2 is formed between the sleeve 6 and the housing 3. The two parts of the fluid volume C are connected to one another via throughflow openings 5 in the sleeve 6, and are connected via throughflow openings 4, 5 in the sleeve 6 to the fluid volume B.

The outer circumference of the end region of the piston rod 2, formed in the shape of a piston with a larger circumference than other regions of the piston rod 2, is substantially equal to the inner circumference of the sleeve 6. The piston of the piston rod 2 is guided in the sleeve 6 and substantially fluidically closes off one side of the fluid volume B, in particular with respect to the fluid volume C1. During a movement of the piston rod 2 relative to the housing along the longitudinal axis 11, the volume of the fluid volume B changes, and the volume of the fluid volume C1 changes in an inversely proportional manner. The fluid volumes B and C are filled, in particular completely filled, with a fluid, in particular a gas or gas mixture, for example air, and/or with a liquid or a liquid mixture, for example oil.

During a movement of the piston rod 2 in the direction of the end of the housing 3 which is illustrated in FIG. 2, the fluid in the fluid volume B is compressed, and the pressure increases in the fluid volume B. The pressure increase gives rise to a force on the piston rod 2, in particular on the piston of the piston rod 2, which force opposes the movement of the piston rod 2. The movement of the piston rod 2 is damped or braked. In the fluid volume C, in particular in the fluid volume C1, the fluid pressure develops inversely proportionally to the fluid pressure in the fluid volume B. An equalization of the fluid pressures in the fluid volume B and in the fluid volumes C1 and C2 occurs via the throughflow openings 4, 5 in a manner dependent on the position, number and size, that is to say shape and cross section, of the throughflow openings 4, 5. The larger the overall cross section that is available between two fluid volumes for the flow of fluid, the more effectively, that is to say in particular more quickly, a pressure equalization can occur between adjacent fluid volumes connected by the throughflow openings. The damping of the assembly 1 is less than in the case of a smaller total cross section which is available for the fluid flow.

During a movement of the piston rod 2 in the direction of the end of the housing 3, throughflow openings 5 are closed by the piston of the piston rod 2. The number of throughflow openings 5 and thus the total cross section for the fluid flow decreases between the fluid volumes B and C2, and the damping increases. The throughflow openings 4 are arranged at the end of the sleeve 6 toward the housing end, and are available for a fluid flow until the end of the movement of the piston rod 2 in the direction of the end of the housing 3. In this way, during the movement, the fluid volume B can be reduced substantially to a volume of zero, with maximum damping of the movement between the point at which the piston of the piston rod 2 reaches the final throughflow openings 5 in the fluid volume B and the point at which the piston of the piston rod 2 reaches the throughflow openings 4.

Via the fluid volume C2, which is formed between sleeve 6 and housing 3 and which forms a constant fluid channel, which does not vary over time, between the, in particular all, throughflow openings 4, 5, fluid can flow from the fluid volume B to the fluid volume C1 in the case of a movement of the piston rod 2 in the direction of the end of the housing 3, and, in the case of a reversed movement of the piston rod 2, fluid can flow from the fluid volume C1 to the fluid volume B. The fluid channel has a size such that little friction with the fluid, and little friction in the fluid itself, arises as said fluid flows. The throughflow openings 5 between the fluid volumes C1 and C2 in the sleeve 6 have a large cross section, in particular larger than the largest total cross section of the throughflow openings between the fluid volumes C2 and B in the sleeve 6. The damping is thus determined by the total cross section of the throughflow openings 4, 5 between the fluid volumes B and C2 that is available for the fluid flow at a point in time.

During a movement of the piston rod 2 in the direction of the end of the housing 3, throughflow openings 5 in the sleeve 6 that were previously available for a fluid flow from the fluid volume B to the fluid volume C2 are closed by the piston of the piston rod 2. The damping increases, and a movement of the piston rod 2 is, in the presence of a constant driving force, braked with increasing intensity over time. During a movement of the piston rod 2 in the opposite direction, that is to say in the direction away from the end of the housing 3, throughflow openings 5 in the sleeve 6 that were previously not available for a fluid flow from the fluid volume B to the fluid volume C2, that is to say in particular were closed by the piston of the piston rod 2, are opened up by the piston of the piston rod 2. The damping decreases with progressive movement. A movement of the piston rod 2 is, in the presence of a constant driving force, braked with progressively decreasing intensity over time.

In the case of the assembly 1 as per the exemplary embodiment of FIG. 2, analogously to the exemplary embodiment of the assembly 1 of FIG. 1, only a decrease or an increase of the damping or damping rate occurs during a movement of the piston rod 2 in one direction. An increase and subsequent decrease of the damping or damping rate during one movement, that is to say during a movement in one direction, is not possible.

Figure 3:
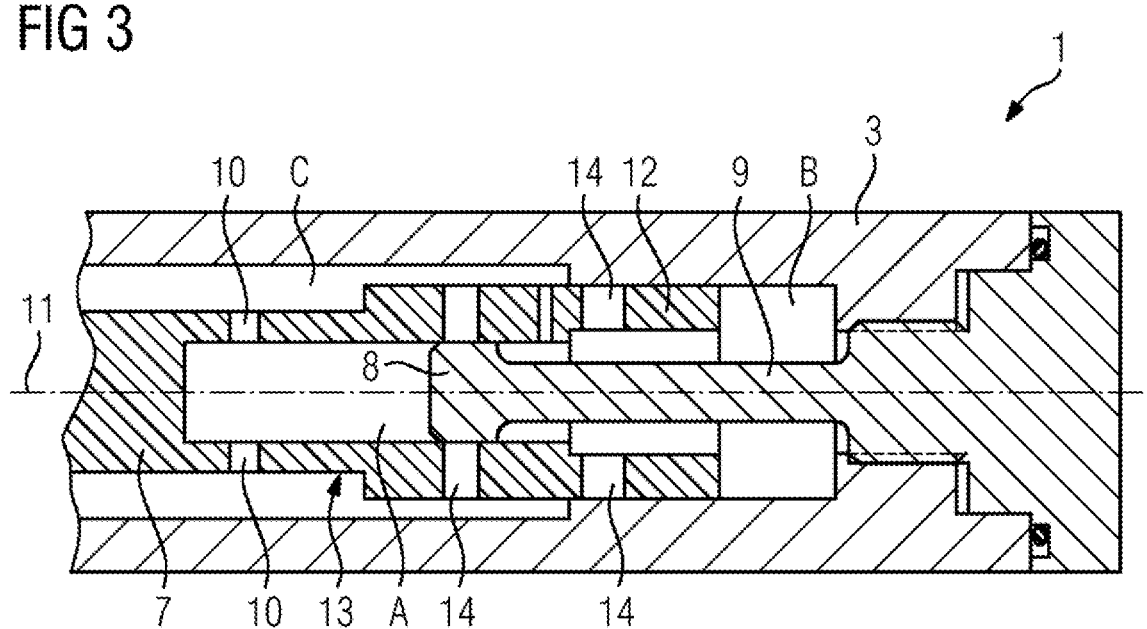

FIG. 3 schematically illustrates a part of an assembly 1 according to the invention for damping switching movements. Analogously to the assembly 1 of FIG. 1, the part, which is shown as a section along a longitudinal axis, comprises an end of the hollow cylindrical, closed-off housing 3 with a rod 7 guided movably in the housing 3, in particular a switching rod of a high-voltage circuit breaker. At an end which is movable in the end of the housing 3, the rod 7 is of hollow tubular, in particular hollow cylindrical, form, with a wall 12 in which throughflow openings 10, 14 are formed. A piston 8 projects into the hollow tubular end of the rod 7. The piston is in particular of circular cylindrical form, with an outer circumference which substantially corresponds to the inner circumference of the hollow tubular end of the rod 7. Via a web 9, in particular a circular cylindrical web, with an outer circumference smaller than the circumference of the piston 8, the piston 8 is connected to the housing 3.

The web 9, the piston 8, the housing 3 and the rod 7 have a common axis 11, in particular in the case of a circular cylindrical web 9, circular cylindrical piston 8, circular cylindrical, hollow tubular housing 3 and circular cylindrical rod 7, a common axis of rotation along which the rod 7 can move relative to the housing 3. During a movement of the rod 7 in the housing 3, the piston 8 analogously moves in the hollow tubular rod 7. A first fluid volume A is delimited by one side of the piston 8 and at least parts of the hollow interior of the hollow tubular rod 7. In a region at the end of the rod 7 and at the closed end of the housing 3, the outer circumference of the rod 7 is substantially equal to the inner circumference of the housing 3, which equates to a substantially identical external shape of the rod 7 and of the recess or of the hollow interior of the housing 3 in this region. The rod 7 is, in this region, guided in substantially positively locking fashion in the housing 3, that is to say by the housing wall during movements of the rod 7.

The web 9 is, beyond the region, of narrower form than the piston 8, that is to say with a circumference smaller than the circumference of the recess in the hollow end of the rod 7. Between the rod 9 and the wall 12 of the hollow tubular end of the rod 7, there is formed a fluid channel which opens into a fluid volume B or is surrounded by the fluid volume B, which is formed between the end of the rod 7 and the end of the housing 3 in the interior. The second fluid volume B is fluidically connected via throughflow openings 10 in the wall 12 of the hollow tubular end of the rod 7 to a third fluid volume C, which third fluid volume is formed between the exterior of the rod 7 and the interior of the housing 3 in the region which adjoins the region at the end of the rod 7 and at the closed end of the housing 3 and in which the outer circumference of the rod 7 is substantially equal to the inner circumference of the housing 3.

The third fluid volume C is connected via throughflow openings 10 in the wall 12 of the hollow tubular end of the rod 7 to the first fluid volume A, which is delimited by one side of the piston 8 and at least parts of the hollow interior of the hollow tubular rod 7. Throughflow openings 10, 14 are formed in the wall 12 with regular and/or irregular spacings to one another along the longitudinal axis 11, and/or along the in particular circular circumference of the wall 12. The throughflow openings 10, 14, in particular in the form of circular bores and/or milled portions, may have different cross sections in a manner dependent on the required fluid flow through the throughflow openings 10, 14. During a movement of the rod 7, the piston 8 moves in the rod 7 such that throughflow openings 14 are temporarily closed by the piston 8. The rod 7 moves in the region at the end of the rod 7 and at the closed end of the housing 3, in which the outer circumference of the rod 7 is substantially equal to the inner circumference of the housing 3, such that throughflow openings 14 in the wall 12 are temporarily closed by the housing 3.

During a movement of the rod 7 in the housing 3 in the direction of the end of the housing 3, as illustrated in FIG. 3, along the longitudinal axis 11, throughflow openings 10, 14 in the wall 12 of the rod 7 that had previously connected the fluid volume A to the fluid volume C are closed in particular in fluid-tight fashion by the piston 8. The spatial volume of the fluid volume A decreases, and fluid is forced through the open throughflow openings 10 from the fluid volume A into the fluid volume C. In a manner dependent on the total cross section of the throughflow openings 10 between the fluid volumes A and C, that is to say the collective cross section of the open throughflow openings 10, and in a manner dependent inter alia on the viscosity of the fluid and the pressure difference between the fluid volumes A and C, only a certain quantity of fluid can flow through the throughflow openings 10 between the fluid volumes A and C per unit of time. In the fluid volume A, a pressure which opposes the movement of the rod 7 is increased, whereby the movement is dampened. The decreasing number, and in association therewith the decreasing total cross section, of the open throughflow openings 10 between the fluid volumes A and C gives rise, with progressive movement, to an increase of the damping by means of the fluid volume A.

On the opposite side of the piston 8, viewed from the fluid volume A, the fluid volume B is fluidically connected via open throughflow openings 10 in the wall 12 to the fluid volume C. Fluid that flows from the fluid volume A into the fluid volume C during a movement of the rod can flow from the fluid volume C into the fluid volume B and vice versa. During a movement of the rod 7 in the housing 3 in the direction of the end of the housing 3, as is illustrated in FIG. 3, along the longitudinal axis 11, the volume of the fluid volume B decreases.

Fluid is forced through the open throughflow openings 10 from the fluid volume B into the fluid volume C if a higher pressure is present in the fluid volume B than in the fluid volume C. In a manner dependent on the total cross section of the throughflow openings 10 between the fluid volumes B and C, that is to say the collective cross section of the open throughflow openings 10, and in a manner dependent inter alia on the viscosity of the fluid and the pressure difference between the fluid volumes A and C, only a certain quantity of fluid can flow through the throughflow openings 10 between the fluid volumes B and C per unit of time. In the fluid volume B, a pressure which opposes the movement of the rod 7 is increased, whereby the movement is further dampened. The damping of the assembly 1 is equal to the sum of the damping actions resulting from the decrease of the fluid volume A, with associated pressure build-up in the fluid volume A in a manner dependent on the fluid flow from the fluid volume A to the fluid volume C via the open throughflow openings 10 between the two fluid volumes A and C, and the damping resulting from the decrease of the fluid volume B, with associated pressure build-up in the fluid volume B in a manner dependent on the fluid flow from the fluid volume B to the fluid volume C via the open throughflow openings 10 between the two fluid volumes B and C.

The total cross section of the throughflow openings 10 between the fluid volumes B and C is dependent on the open throughflow openings 10 between the fluid volumes B and C, wherein, with progressive movement of the rod 7, throughflow openings 10, 14 in the wall 12 are moved from the region of the fluid volume A into the region of the piston 8 and further into the region between the piston 8 and the region at the closed end of the housing 3, in which the outer circumference of the rod 7 is substantially equal to the inner circumference of the housing 3. Here, the throughflow openings 10, 14 in the wall 12 are, in the region of the piston 8, closed by the piston 8 and, during further movement in the region behind the piston 8, opened up again. Proceeding from the region at the closed end of the housing 3, in which the outer circumference of the rod 7 is substantially equal to the inner circumference of the housing 3, the throughflow openings 10, 14 are closed again, in this region by the housing 3.

With different cross sections of the throughflow openings 10, 14 in the wall 12 along the longitudinal axis 11, the damping is determined inter alia by the total cross section of the throughflow openings 10 between the piston 8 and the region at the closed end of the housing 3, in which the outer circumference of the rod 7 is substantially equal to the inner circumference of the housing 3. Since the throughflow openings 10, 14 only "pass through" in this region, throughflow openings 10 with a small cross section in the region can lead to intense damping, and subsequent throughflow openings 10 with a larger cross section in the region can lead to less intense damping, in particular in the case of spacings of throughflow openings 10 in the region of the fluid volume A which are sufficiently large, that is to say larger than the spacings in the region where the throughflow openings 10 "pass through". Then, during a movement of the piston 8 between two throughflow openings 10 in the region of the fluid volume A, the damping by the fluid volume A remains constant, and changes in the damping are determined by throughflow openings 10 in the region where the throughflow openings 10 "pass through". Small throughflow openings 10 in the region lead to intense damping, and large throughflow openings 10 lead to low damping.

In the case of a sequence from large throughflow openings 10 to small throughflow openings 10, the damping can decrease, after a prior increase, and vice versa, or may alternately increase and decrease or decrease and increase, in a manner dependent on the cross sections of the successive throughflow openings 10. In the presence of a constant driving force acting on the rod 7, in the range of the damping force of the assembly 1 according to the invention, changes in the damping by means of the successive cross sections of the throughflow openings 10 can lead to alternating damping and acceleration of the drive rod 7 during one movement, that is to say a movement of the drive rod 7 in one direction.

Figure 4:
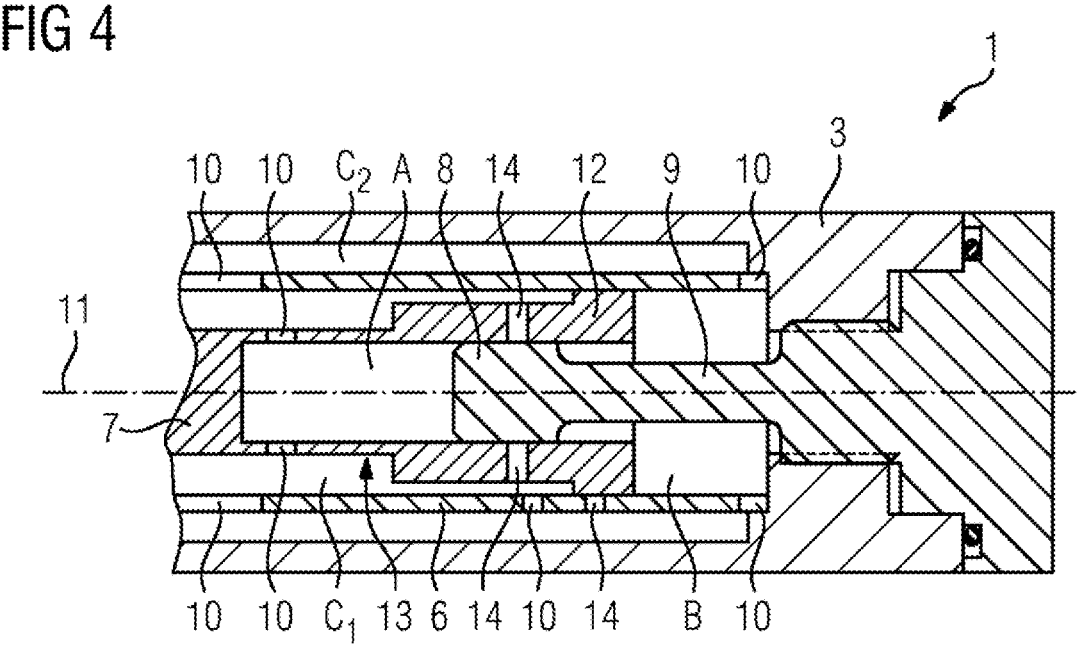

FIG. 4 schematically shows, in a sectional view, a second exemplary embodiment of the assembly 1 according to the invention of FIG. 3. By contrast to the exemplary embodiment of FIG. 3, the assembly 1 according to the invention of FIG. 4 has a sleeve 6 which comprises throughflow openings 10. The hollow tubular end 13 of the rod 7 is mounted and/or guided not directly in the wall of the housing 3 but in the sleeve 6, which is fastened to the end of the housing 3. Permanent throughflow openings 10 for the fluid are arranged in the region of the fastening of the sleeve 6 to the housing 3. The sleeve 6 divides the fluid volume C into two parts C1 and C2. The fluid volume C2 is delimited by the housing 3 and the sleeve 6, and the fluid volume C1 is delimited by the sleeve 6 and the rod 7.

During a movement of the rod 7 in the direction of the end of the housing 3, as shown in FIG. 4, along the longitudinal axis 11, the piston 8 is moved further into the hollow tubular end 13 of the rod 7, and the first fluid volume A is reduced in size. With progressive movement, an increasing number of throughflow openings 14 in the wall 12 of the hollow tubular end 13 of the rod 7 are closed, and the number of open throughflow openings 10 in the wall 12, and the total cross section for the fluid flow, decreases.

In the case of the same movement of the rod 7 or driving force on the rod 7, the fluid can escape more slowly from the first fluid volume A through the open throughflow openings 10 in the wall 12 into the fluid volume C1, and the force on the rod 7, or damping, which opposes the movement increases.

At the same time, the rod 7 moves in the direction of the end of the housing 3 in the sleeve 6 such that the second fluid volume B decreases. Fluid can escape through the open throughflow openings 10 in the sleeve 6, in particular through the permanent open throughflow openings 10 at the end of the sleeve, in the region where the sleeve 6 is connected to the housing. With progressive movement, an increasing number of throughflow openings 14 in the sleeve 6 are closed, and the number of open throughflow openings 10 directly fluidically connected to the fluid volume B, and the total cross section for the fluid flow out of the fluid volume B, decreases. In the case of the same movement of the rod 7 or driving force on the rod 7, the fluid can escape more slowly from the second fluid volume B through the open throughflow openings 10 into the fluid volume C2, and the force on the rod 7, or damping, which opposes the movement increases.

With progressive movement, behind the piston 8, on the side toward the web 9, throughflow openings 14 for the fluid flow that are closed by the piston 8 are opened up, that is to say fluid from the fluid volume B can flow through said throughflow openings 10 into the fluid volume C2. From that end of the rod 13 which is guided in the sleeve 6 in a manner connected in substantially fluid-tight fashion to the sleeve 6, with progressive movement, closed throughflow openings 14 in the sleeve 6 are opened up for the fluid flow, that is to say fluid from the fluid volume C1, in particular fluid that has previously flowed from the fluid volume A into the fluid volume C1, can flow through said throughflow openings 10 into the fluid volume C2. The outflow cross section, that is to say the total cross section for the fluid flow through open throughflow openings 10, increases, in particular toward the end of the movement in the case of corresponding arrangement of the throughflow openings 10 and selection of the cross sections. In the case of the same movement of the rod 7 or driving force on the rod 7, the fluid can escape more quickly from the second fluid volume B through the open throughflow openings 10 into the fluid volume C2 and more quickly from the first fluid volume A via the fluid volume C1 through the open throughflow openings 10 in the sleeve 6 into the fluid volume C2, and the force on the rod 7, or damping, which opposes the movement decreases. In the case of the same movement of the rod 7 or driving force on the rod 7, the rod 7 can be moved in an accelerated manner, in particular toward the end of the movement, after a previous braking of the movement in the same movement direction or during the same switching process.

The fluid in the above-described exemplary embodiments is a gas or gas mixture, for example air and/or clean air, and/or a liquid, for example an oil. The housing 3 is filled, in particular completely filled, with the fluid. The housing 3 may be entirely sealed off with respect to the environment, in particular if using liquid fluids such as for example oil, or environmentally harmful fluids, such as for example $SF_6$, or in the case of fluids such as for example clean air. For this purpose, on one side of the housing 3, there may be arranged a type of pipe plug and/or cover, which, in particular by means of a sealing ring, closes and/or seals off the interior of the housing 3, in particular of a hollow tubular housing. The pipe plug and/or cover may be screwed into the rest of the housing 3, in particular by means of threads. The web 9 may alternatively also be screwed or fastened directly in the housing 3 from the inside. Without the use of a pipe plug and/or cover, with a closed housing end, it is possible for seals to be omitted at this location.

The above-described exemplary embodiments may be combined with one another and/or may be combined with the prior art. Accordingly, it is for example possible for the housing 3, the rod 7, the piston 8, the web 9 and/or the sleeve 6 to be composed of a metal or to comprise a metal. In particular, the elements of the assembly 1 according to the invention may be composed of steel. Throughflow openings 10, 14 may be formed by milling or drilling in the material, in particular metal. The housing 3, the rod 7, the piston 8, the web 9 and/or the sleeve 6 may for example have circular cylindrical shapes, and/or have rectangular, square, triangular and/or elliptical shapes, that is to say cross sections perpendicular to the longitudinal axis 11.

LIST OF REFERENCE DESIGNATIONS

1 Assembly for damping switching movements
2 Piston rod
3 Housing, in particular cylindrical housing
4 Permanent bore
5 Flute bore
6 Sleeve
7 Rod, in particular switching rod
8 Piston
9 Web
10 Throughflow opening, i.e. fluid channel
11 Longitudinal axis
12 Wall of the hollow tubular end of the rod
13 Hollow tubular end of the rod
14 Opening closed by the housing/piston/rod
A First fluid volume
B Second fluid volume
C Third fluid volume
C1 First part of the third fluid volume
C2 Second part of the third fluid volume

The invention claimed is:
1. An assembly for damping switching movements, the assembly comprising:

at least one piston;

at least one rod being formed with a hollow tubular end;

a housing spatially encasing said at least one piston and at least partially encasing said at least one rod, wherein said rod is mounted to be movable relative to said housing;

said at least one piston delimiting a first fluid volume that is fluidically connected via at least one throughflow opening to at least one second fluid volume;

said at least one rod spatially surrounding the first fluid volume and said at least one piston being guided in said hollow tubular end of said at least one rod; and a hollow sleeve disposed between said housing and said at least one rod, and wherein said hollow tubular end of said at least one rod is guided within said hollow sleeve, and said hollow sleeve is formed with throughflow openings.

2. The assembly according to claim 1, wherein the first fluid volume is connected to the second fluid volume via a third fluid volume.

3. The assembly according to claim 2, wherein the first fluid volume is delimited by a wall of said hollow tubular end of said at least one rod and by said piston, and/or wherein the third fluid volume is formed between said rod and said housing, and/or wherein the second fluid volume is delimited by said housing and by said wall of said hollow tubular end of said at least one rod and also by said piston with the web and the second fluid volume includes a fluid volume of openings which are closed by the housing.

4. The assembly according to claim 3, wherein:

said hollow sleeve divides said third fluid volume into two parts and is formed with at least one throughflow opening that fluidically connects the two parts of the third fluid volume to one another; and/or at least one throughflow opening is formed in the wall of said hollow tubular end of said at least one rod for fluidically connecting a first part of the third fluid volume to the first fluid volume; and/or at least one throughflow opening is formed in said sleeve for fluidically connecting a second part of the third fluid volume to the second fluid volume.

5. The assembly according to claim 4, wherein said throughflow openings are permanent bores or milled portions and said throughflow openings are flute-shaped.

6. The assembly according to claim 2, which comprises a fluidic connection of the first and third fluid volumes and of the third and second fluid volumes via throughflow openings in a wall of said hollow tubular end of said at least one rod.

7. The assembly according to claim 1, wherein at least one of said fluid volumes is filled with a fluid and/or a fluid mixture.

8. The assembly according to claim 7, wherein said fluid is selected from the group consisting of gas and liquid.

9. The assembly according to claim 8, wherein said fluid is selected from the group consisting of air, clean air, and an oil.

10. The assembly according to claim 1, wherein said hollow tubular end of said at least one rod has a wall formed with a plurality of openings distributed along a longitudinal axis of said rod.

11. The assembly according to claim 10, wherein said plurality of throughflow openings include openings with different throughflow cross sections.

12. The assembly according to claim 1, wherein said at least one piston is spatially fixed relative to said housing.

13. The assembly according to claim 1, which comprises a web connecting said piston to said housing, and said web having a smaller cross section perpendicular to a longitudinal axis of said web than said piston.

14. The assembly according to claim 1, wherein elements of the assembly have a cylindrical shape, said elements being selected from the group consisting of said housing, said at least one rod, said at least one piston, said at least one sleeve, and least one web.

15. The assembly according to claim 1, configured for incorporation into a high-voltage circuit breaker and for damping switching movements.

16. A method for damping a switching movement in a high-voltage circuit breaker, the method comprising:

providing the assembly according to claim 1; and decreasing a damping rate of an assembly for damping the switching movement in a time period during the switching movement, after a prior increase of the damping rate during the switching movement; and:

a) moving a rod with a hollow tubular end inside a housing to thereby cause a piston to move inside of, and relative to, the hollow tubular end of the rod and a fluid to flow from a first fluid volume in the hollow tubular end of the rod via throughflow openings in a wall of the hollow tubular end into a third fluid volume which is formed between the rod and the housing, and a fluid to flow from a second fluid volume, which is surrounded by the piston, by the end of the rod and by the housing, via throughflow openings in the wall of the hollow tubular end of the rod into the third fluid volume; or b) moving a rod with a hollow tubular end in a sleeve, which is arranged in a housing, to thereby move a piston in, and relative to, the hollow tubular end of the rod and a fluid to flow from a first fluid volume in the hollow tubular end of the rod via throughflow openings in the wall of the hollow tubular end into a first part, which is formed between the rod and the sleeve, of the third fluid volume, and fluid to flow from the first part of the third fluid volume into a second part of the third fluid volume via throughflow openings in the sleeve, wherein the second part of the third fluid volume is formed by the sleeve and by the housing, and fluid flows from a second fluid volume, which is surrounded by the piston, by the end of the rod, by the sleeve and by the housing, into the second part of the third fluid volume via throughflow openings in the sleeve.

\* \* \* \* \*